UNITED STATES PATENT OFFICE.

JAMES J. FAULKNER, OF MEMPHIS, TENNESSEE, ASSIGNOR TO THE STANDARD COTTON SEED COMPANY, OF ARKANSAS.

PROCESS OF MANUFACTURING EMERY BLOCKS.

SPECIFICATION forming part of Letters Patent No. 557,503, dated March 31, 1896.

Application filed January 28, 1896. Serial No. 577,165. (No specimens.)

*To all whom it may concern:*

Be it known that I, JAMES J. FAULKNER, a citizen of the United States, residing at Memphis, in the county of Shelby and State of Tennessee, have invented certain new and useful Improvements in Processes of Manufacturing Emery Blocks; and I do hereby declare the following to be a full, clear, and exact description of the invention, such as will enable others skilled in the art to which it appertains to make and use the same.

My invention relates to improvements in abrading materials and processes for manufacturing the same; and it consists in an improved process for manufacturing emery articles which will be hereinafter fully described, and particularly pointed out in the claims.

In the practical use of emery blocks in machines run at sufficiently high speed to develop considerable heating of the blocks by the friction to which they are exposed, such as machines for delinting cotton-seed, I have found that emery blocks constructed by the processes now known and used in the art are unsatisfactory, because if made sufficiently hard to perform the function for which they are intended the blocks are apt to disintegrate under the high heat which they attain, and if in their manufacture sufficient linseed-oil is left in the blocks to enable them to possess the required tenacity and strength they almost uniformly glaze and thus become useless for practical operative purposes. Not one of the processes for manufacturing emery which are now in use seems to be capable of producing a block which will not disintegrate when heated to a temperature of, say, 400° Fahrenheit during and by virtue of its operation and which will at the same time not glaze.

The object of this invention is to provide a process for manufacturing emery blocks by the use of which emery blocks can be produced having the required hardness and tenacity and suitable in every way for use in high-speed machines under conditions which give rise to relatively high degrees of temperature.

In the course of the experiment which I have conducted in the manufacture of emery blocks I have found that glue is unsuitable for use in such blocks, because when heated to a degree sufficient to harden the linseed-oil generally used in the manufacture of emery blocks the glue loses its adhesive quality, and thus is of no value. I have therefore discarded the use of glue in emery blocks, and use instead as a binding material some such substance as pulverized oxid of iron, mineral paint, lampblack, &c. These substances not only give cohesion and solidity to the mass, but further assist in preventing the glazing which would take place were oil alone used with the emery in the manufacture of the blocks.

The essential feature of my improved process, however, consists in the method I have adopted for baking the emery after it has been formed in a paste with the other ingredients of the blocks and has been molded into the desired shape.

In the manufacture of the blocks I first form a mixture of the various ingredients of the finished blocks in proportions which will insure the block having sufficient hardness to successfully perform the functions assigned to it, and then, after molding the mixture into the desired shape, subject the molded article or articles to a preliminary baking at a relatively low degree of temperature, continuing such baking until the blocks have obtained sufficient hardness and cohesiveness to hold their shape. I then dip the blocks, while still hot, into heated oil, thereby adding to the blocks a sufficient amount of oil to give them a tenacity which will prevent their disintegrating under the high degree of heat to which they are subjected in their normal action and proceed in the finishing of the blocks by subjecting them to a final heating at a temperature which is gradually raised as the oil in the blocks becomes solidified until at last it reaches a point sufficient to thoroughly harden and finish the blocks.

My process in detail is as follows:

First. I first boil a quantity of linseed-oil down to a thick consistency, thereby increasing its glucose property according to its bulk, and thus saving time in the baking to which it is afterward subjected in completing the manufacture of the blocks. Instead of using linseed-oil, I may use Japan varnish or other substances possessing like characteristics.

Second. I form a stiff dough of a quantity of pulverized oxid of iron with the boiled linseed-oil, kneading the mass thoroughly, so that the mixture is complete. Instead of using pulverized oxid of iron, lampblack, alabastine, ground silicate, flour of emery, plumbago, or any other substance may be used which possesses the power to emit the gas generated in baking.

Third. I next saturate crushed emery, preferably what is termed in the art "crushed Turkish emery," with the boiled linseed-oil for the purpose of moistening every grain of the emery, so that it will more thoroughly mix with and adhere to the dough formed by the second step of the process. In this manner I also facilitate a thorough mixture of the mass.

Fourth. The emery, thoroughly saturated with oil, as prepared in the third step of the process, is next thoroughly kneaded with the dough formed by the second step of the process—namely, by mixing together a binding material, such as pulverized oxid of iron with linseed-oil—and the mass thoroughly kneaded until the emery is distributed evenly and uniformly throughout the same.

Fifth. Having now formed the mixture from which the blocks or other articles are to be molded, I mold the mixture into the form desired, whether blocks, such as are suitable for cotton-seed delinting, or wheels, or any other desired shape.

Sixth. I now bake the molded articles from six to twelve hours in order to harden such articles sufficiently to enable them to gain sufficient consistency to hold their shape. This preliminary baking, in effect a drying process, is conducted at a temperature preferably not exceeding 200° Fahrenheit, as this temperature is not sufficient to injure the qualities of the oil used in the process, and is yet sufficient to harden the blocks in the manner described.

Seventh. The molded articles or blocks are now dipped, while hot, into boiling linseed-oil, such as was obtained by the first step of this process. The reason for so doing is that I have found by experiment that it is impossible to obtain an emery composition of proper consistency for molding which at the same time has sufficient linseed-oil in its composition to permit the completed article to have sufficient tenacity to enable it to resist disintegration when subjected to high operative temperatures. By proceeding in the manner described, however, first subjecting the molded articles or blocks to a preliminary baking, and then dipping the blocks, while hot, into boiling oil, I am able to add to the blocks a sufficient quantity of oil to give them the requisite tenacity and solidity, while yet not running any danger of causing the blocks to glaze. By dipping the blocks, while still hot, into heated oil I find that the blocks more readily absorb the oil.

Eighth. I now continue the baking of the blocks at a temperature which is gradually increased from 200° Fahrenheit to 600° or 700° Fahrenheit until the blocks are completed. It is essential that the blocks be not at once subjected to the high degree of temperature which is incident to their completion, because if subjected at once to a temperature of 600° or 700° Fahrenheit the linseed-oil in the mixture is destroyed instead of hardened, and hence the completed article will not possess the desired characteristics. Only by commencing the final baking at a low degree of temperature and gradually increasing the temperature as the oil in the composition of the article gradually hardens and becomes able to sustain the greater heat can the desired result be obtained.

Emery blocks prepared by the process thus described can be successfully used under operative conditions resulting in a high degree of temperature.

While I vary the proportions of the various ingredients within quite wide limits, I will state the following proportions as one which has been found to produce a satisfactory abrading block: boiled linseed-oil or Japan varnish, one gallon; pulverized oxid of iron or other binding ingredient, fifteen to twenty pounds; crushed Turkish emery, forty to fifty pounds.

The process thus described results in the production of blocks of solid emery composition. The method of baking described is, however, equally applicable to coating such substances as iron with the emery composition for use in those machines where a solid emery block is not desirable. This may be done by dipping the surface of the iron to be coated into the mixture or dough prepared by the fourth step of the above-described process, then sprinkling crushed emery over the surface thus coated, and then baking just the same as blocks for about six hours at a temperature preferably not exceeding 200° Fahrenheit, the process being repeated until an abrading-surface is obtained which is of the desired thickness and size. The final baking is now carried on in the same manner as is the process described—namely, by dipping the coated surface into boiling linseed-oil and then baking such surface at a temperature which is gradually increased from about 200° to about 600° or 700° Fahrenheit. When so prepared the emery will cling to the iron surface, for which it forms a coating, and will preserve its tenacious and strong quality.

While I have described my process as being adapted for producing emery blocks to be used upon the revolving abrading-surface of a cotton-seed delinter, it is evident that it may be used with equal advantage in the manufacture of any article made of emery, and I do not limit myself to the use of my process in the manufacture of emery blocks for cotton-seed delinters.

Having thus described my process, what I claim as new, and desire to secure by Letters Patent, is—

1. That improvement in the art of manufacturing emery articles, which consists in— first: forming a mixture of crushed emery, a binding material, such as pulverized oxid of iron, and an oil; second: molding the mixture into the desired shape; third: subjecting such molded article to a preliminary heating at a temperature insufficient to injure the oil, and continuing the heating until the same has been hardened sufficiently to hold its shape; fourth: dipping the molded articles into oil, and fifth: subjecting the same to a final heating, substantially as described.

2. The herein-described process of manufacturing emery articles, which consists in; first: boiling an oil, such as linseed-oil, down to a thick consistency; second: forming a mixture of a binding material, such as pulverized oxid of iron, and an oil; third: saturating crushed emery with the boiled oil; fourth: forming a mixture of such saturated emery with the mixture of the binding material and boiled oil; fifth: molding the completed mixture into the desired shape; sixth: subjecting the molded articles to a preliminary baking at a temperature insufficient to injure the oil; seventh: dipping the molded articles while still hot into heated oil; and eighth: subjecting the molded articles to a final heating at a temperature gradually increased from a relatively low temperature to a relatively high temperature, substantially as described.

3. That improvement in the art of manufacturing emery articles, which consists in; first: boiling an oil, such as linseed-oil, down to a thick consistency; second: forming a mixture of a binding material, such as pulverized oxid of iron, and an oil; third: saturating crushed emery with the boiled oil; fourth: forming a mixture of such saturated emery with the mixture of the binding material and boiled oil, fifth: molding the completed mixture into the desired shape; and, sixth: baking the molded article, substantially as described.

In testimony whereof I affix my signature in presence of two witnesses.

JAMES J. FAULKNER.

Witnesses:
J. F. HUDSPETH,
HUGH B. CULLEN.